United States Patent
Mall

(10) Patent No.: US 6,840,720 B2
(45) Date of Patent: Jan. 11, 2005

(54) MACHINE FOR DEBURRING AND FINE MACHINING OF TOOTH FLANKS OF TOOTHED WORKPIECES

(75) Inventor: Johann Mall, Furstenfeldbruck (DE)

(73) Assignee: The Gleason Works, Rochester, NY (US)

( * ) Notice: Subject to any disclaimer, the term of this patent is extended or adjusted under 35 U.S.C. 154(b) by 334 days.

(21) Appl. No.: 10/142,297

(22) Filed: May 9, 2002

(65) Prior Publication Data

US 2002/0197121 A1 Dec. 26, 2002

(30) Foreign Application Priority Data

Jun. 21, 2001 (DE) .......................................... 101 29 881

(51) Int. Cl.$^7$ ................................................ B23F 19/00
(52) U.S. Cl. .............................. 409/8; 409/40; 409/55; 451/47; 451/65
(58) Field of Search ........................... 409/4, 8, 9, 37, 409/40, 41, 49, 55; 451/47, 65

(56) References Cited

U.S. PATENT DOCUMENTS

| | | | | |
|---|---|---|---|---|
| 2,174,783 A | * | 10/1939 | Fish ............................. | 409/8 |
| 2,278,300 A | * | 3/1942 | Barter et al. .................. | 409/8 |
| 3,233,518 A | * | 2/1966 | Paulger ......................... | 409/8 |
| 3,729,967 A | * | 5/1973 | Bauknecht et al. ........... | 72/102 |
| 3,894,418 A | * | 7/1975 | Horl ............................ | 72/108 |
| 4,068,558 A | * | 1/1978 | Loos ............................ | 409/8 |
| 4,155,677 A | | 5/1979 | Loos | |
| 4,290,718 A | * | 9/1981 | Occhialini .................... | 409/8 |
| 4,334,810 A | * | 6/1982 | Behnke et al. ............... | 409/9 |

FOREIGN PATENT DOCUMENTS

| | | | | |
|---|---|---|---|---|
| DE | 6604270 | | 12/1967 | |
| DE | 2659108 | | 4/1982 | |
| DE | 3619537 | * | 3/1987 | ............... 409/8 |
| DE | 4020611 | * | 5/1991 | ............... 409/8 |
| DE | 4441927 | | 3/1996 | |
| DE | 29906545 | | 9/1999 | |
| DE | 19918289 | | 10/2000 | |
| JP | 197316 | * | 10/1985 | ............... 409/8 |
| JP | 241020 | * | 10/1986 | ............... 409/8 |
| RU | 921728 | * | 4/1982 | ............... 409/8 |

OTHER PUBLICATIONS

Derwent abstract for German patent 4441927, Mar. 14, 1996.*
Derwent abstract for German 19918289, Sep. 23, 2003.*
English Translation of Official Action of May 14, 2002 issued by German Patent Office in DE 10129881.1.

* cited by examiner

*Primary Examiner*—Daniel W. Howell

(57) ABSTRACT

A machine for deburring and fine machining of the tooth flanks of toothed workpieces with a gear-shaped fine machining tool, preferably, a shaving wheel, which is in rolling engagement with a workpiece, comprising a tool spindle, a motor for driving the tool spindle, a workpiece spindle with a clamping device for the workpiece, a motor for driving the workpiece spindle, a sensor correlated with the workpiece spindle for determining the angular position of the teeth of the workpiece relative to the axis of the workpiece and an electronic gear coupling the drive motors of the tool spindle and of the workpiece spindle which, as a function of the signal of the sensor, rotates the fine machining tool and the workpiece such relative to one another that tooth and gap are aligned. In this connection, it is provided that on the tool spindle, in addition to the fine machining tool, at least one toothed deburring tool is fixedly arranged, wherein the rotational position of the deburring tool and of the fine machining tool relative to the tool spindle is defined by an index.

5 Claims, 6 Drawing Sheets

MACHINE FOR DEBURRING AND FINE MACHINING OF TOOTH FLANKS OF TOOTHED WORKPIECES

FIELD OF THE INVENTION

The invention relates to a machine for deburring and fine machining tooth flanks of toothed workpieces by means of a gear wheel-shaped fine machining tool, preferably a shaving cutter, which is in rolling engagement with a workpiece.

BACKGROUND OF THE INVENTION

In the documents of the German Utility Model 299 06 545.6 a machine of the aforementioned kind is described which, however, serves only for fine machining the tooth flanks of workpieces which are already deburred. The deburring of the workpiece is carried out in a known way on a separate deburring machine. This deburring machine comprises a workpiece spindle with a clamping device for clamping the workpiece, a tool spindle with a deburring tool, and a motor for driving one of the two spindles. The deburring tool is comprised of a driving wheel which can be brought into engagement with the immobile workpiece and of two deburring wheels which are fixedly connected to the driving wheel. Upon rotation of the deburring tool the teeth of the two deburring wheels engage the tooth gaps of the workpiece. As a result of the high pressing force exerted by the deburring wheels, a plastic deformation of the workpiece results on the sharp edges at the transition of the tooth flanks into the end faces. The clamping of the workpiece in the deburring machine and subsequently in the fine machining machine requires a corresponding manual expenditure, respectively, or two separate automatic transfer devices are required.

It is an object of the invention to further develop the machine of the aforementioned kind such that the deburring and fine machining of the workpiece can be performed with a single clamping arrangement.

SUMMARY OF THE INVENTION

According to the invention at least one toothed deburring tool is fixedly arranged on the tool spindle in addition to the fine machining tool, wherein the rotational position of the deburring tool and of the fine machining tool relative to the tool spindle is defined by an index.

After the angular position of the workpiece clamped on the workpiece spindle of the machine has been determined by the correlated sensor, it can be accelerated to the rotary working speed and can be brought into engagement with the rotating deburring tool. The threading of the deburring tool and of the workpiece is realized by NC control by electronic indexing of the driven tool. The actual deburring process is also NC controlled. The feed and feed rate is freely programmable. Accordingly, the chamfer width is also freely programmable.

In the prior art, the chamfer width can be changed to a certain degree by changing the relative rotational position of the two deburring wheels connected to the guide wheel. In contrast to this, with the machine according to the invention the chamfer width is freely selectable by a corresponding adjustment of the torque action exerted by the two drive motors onto the workpiece spindle and the tool spindle, respectively.

In order to bring the workpiece after deburring into engagement with the fine machining tool, a new indexing is not required because the rotational position of the fine machining tool relative to the deburring tool is set.

The deburring tool can be of different configurations. For example, it can comprise a deburring wheel with two-sided working action or can comprise two deburring wheels with a single-sided working action. In both cases, deburring of workpieces of any width is possible. Alternatively, the two deburring wheels can be arranged either on both sides or on one side of the fine machining tool. In another embodiment, the two deburring wheels can be combined with a spacer wheel to a compact tool.

DETAILED DESCRIPTION OF THE PREFERRED EMBODIMENTS

Figure 1:
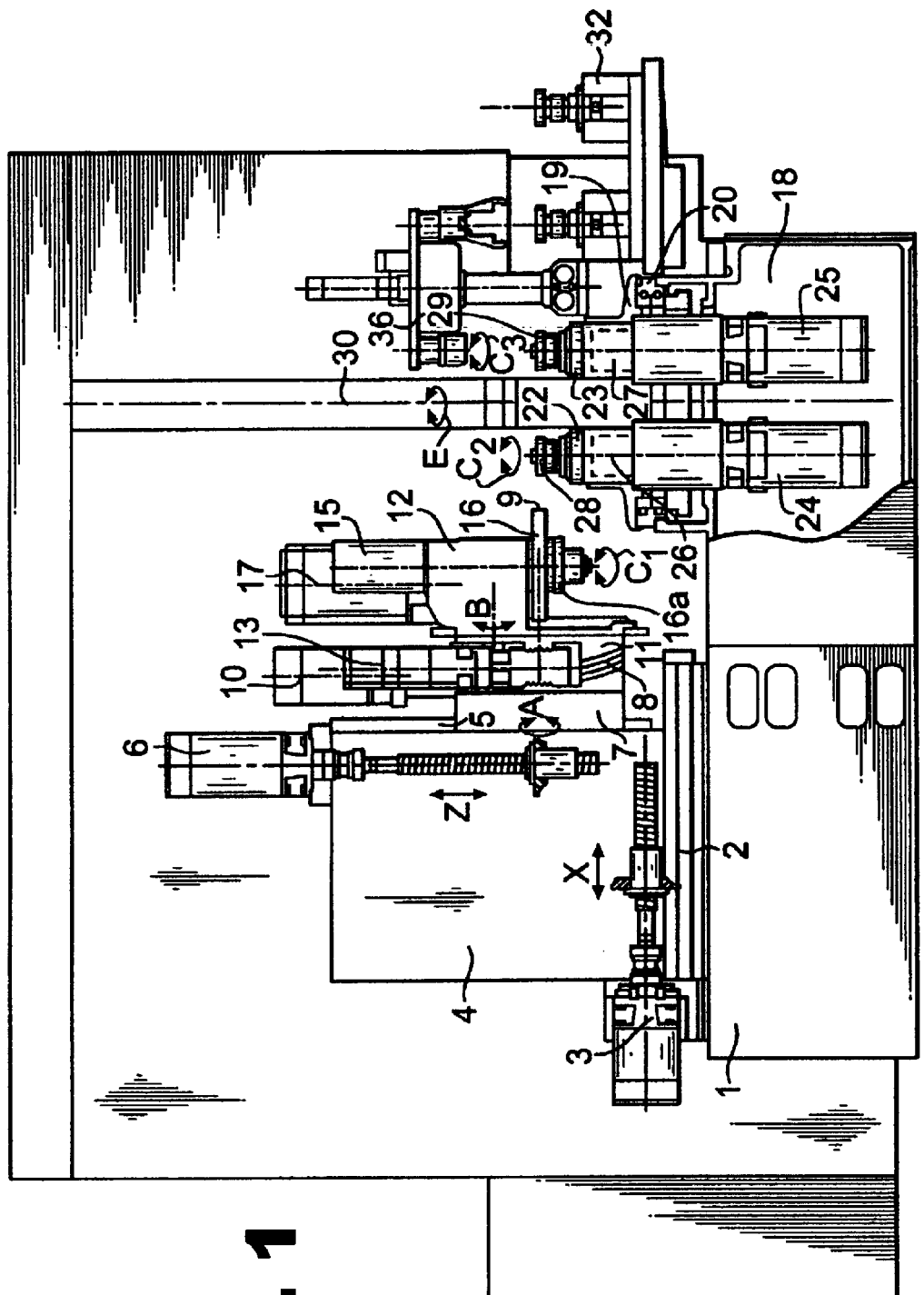
FIG. 1 a side view of a machine for fine machining of the tooth flanks of toothed workpieces with a tool having an external toothing.

A preferred embodiment of the invention will be explained in more detail in the following with the aid of the drawings.

The machine illustrated in the drawings serves for fine machining of tooth flanks of toothed workpieces by means of a tool having an external toothing in a single flank or double flank rolling engagement. Fine machining of a gear wheel-type workpiece is to be understood as shaving or honing.

The inventive machine comprises a machine frame; a first slide moveably supported on the machine frame and configured to be driven for movements along a first axis X; a second slide moveably supported on the first slide and configured to be driven for movements along a second axis Z which is positioned at a right angle to the first axis X; a tool head which is connected pivotably to the second slide and configured to be swiveled for adjusting the axis crossing angle between the fine machining tool and the workpiece about a third axis A which is parallel to the first axis X; a motor arranged on the tool head for driving a tool spindle; a workpiece spindle with a clamping device for clamping the workpiece; a motor for driving the workpiece spindle; a sensor correlated with the workpiece spindle for determining the angular position of the teeth of the workpiece relative to the axis of the workpiece; and an electronic gear coupling the drive motors of the tool spindle and of the workpiece spindle and configured to rotate, as a function of a signal of the sensor, the fine machining tool and the workpiece relative to one another such that tooth and gap are aligned.

The machine illustrated in FIG. 1 has a machine frame 1 with a horizontal guide 2 and a drive motor 3 for adjusting a horizontal slide 4 along a first axis X. The horizontal slide 4 itself has a vertical guide 5 and a drive motor 6 for adjusting a vertical slide 7 in the direction Z.

A circular arc-shaped guide 8 is integrated into the vertical slide 7 and has a center point 9 positioned on the pitch diameter of a tool. The guide 8 serves for pivotably supporting a swing-tray slide 11 about a horizontal axis B. A drive motor 10 is arranged on the vertical slide 7 for pivoting the swing-tray slide 11 about the axis B in order to adjust the conicity of the toothing. A tool head 12 is connected pivotably with the swing-tray slide 11. The tool head 12 can be pivoted by a motor 13 about an axis A which is parallel to the direction X. This pivoting action of the tool head 12 serves for adjusting the axis crossing angle between the tool and the workpiece. A tool spindle 14 is rotatably arranged in the tool head 12 for rotation about an axis $C_1$. The tool spindle 14 is provided with a revolving clamping device 15 for a semi-automatic clamping of a gear wheel-shaped fine machining tool 16 and a deburring tool 16a.

The rotational position of the fine machining tool 16 and of the deburring tool 16a relative to the tool spindle 14 is defined by an index. This can be realized, for example, such that the fine machining tool 16 and the deburring tool 16a are provided with an off-center axial bore, respectively, which can be brought into engagement with a pin arranged on the tool spindle 14. The machine is provided with NC control whose software can compute the position of the tooth gaps of the fine machining tool 16 and of the deburring tool 16a.

A drive motor 17 for driving the tool spindle 14 about the axis C, is arranged on the tool head 12. The fine machining tool 16 can be a serrated shaving cutter, a rolling die, a CBN- or diamond-coated hard shaving wheel, a dressable tool such as a honing wheel or a fine finishing wheel.

Figure 2:
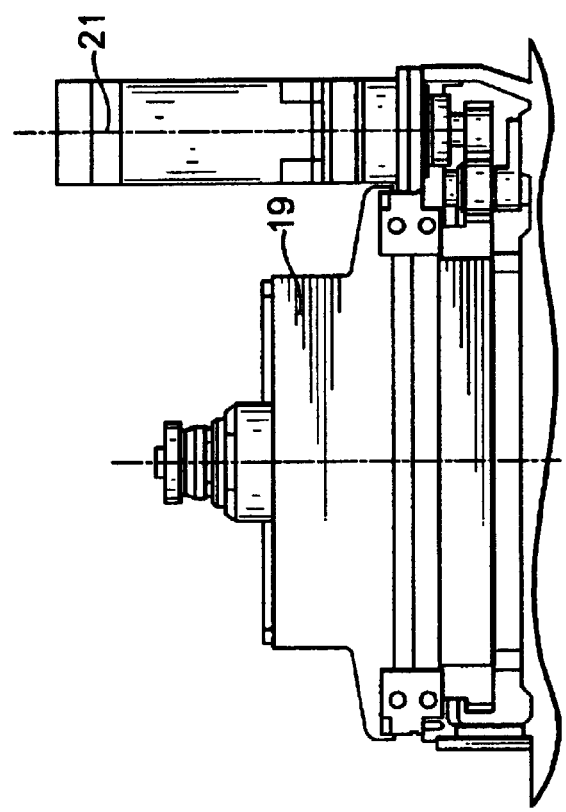
FIG. 2 a view of an indexing table of the machine of FIG. 1.

A second machine frame 18 is fixedly connected with the machine frame 1, for example, by screw connections. On the second machine frame 18 an indexing table 19 is supported by means of an annular bearing 20 for rotation about a vertical axis E. A motor 21 is arranged on the machine frame 18 which is connected by an intermediate gear with the indexing table 19 (see FIG. 2). The precise position of the indexing table relative to the machine frame 18 is secured by an index 31.

Two workpiece spindles 22 and 23 with vertical axes $C_2$ and $C_3$ are arranged on the indexing table 19. The two workpiece spindles 22 and 23 have correlated therewith a drive motor 24 and 25, respectively. The workpiece spindles 22 and 23 are moreover provided with revolving clamping devices 26 and 27. The energy supply of the drive motors 24 and 25 and of the clamping devices 26 and 27 is realized by an energy supply column 30 that is concentric to the axis E of the indexing table 19.

Figure 3:
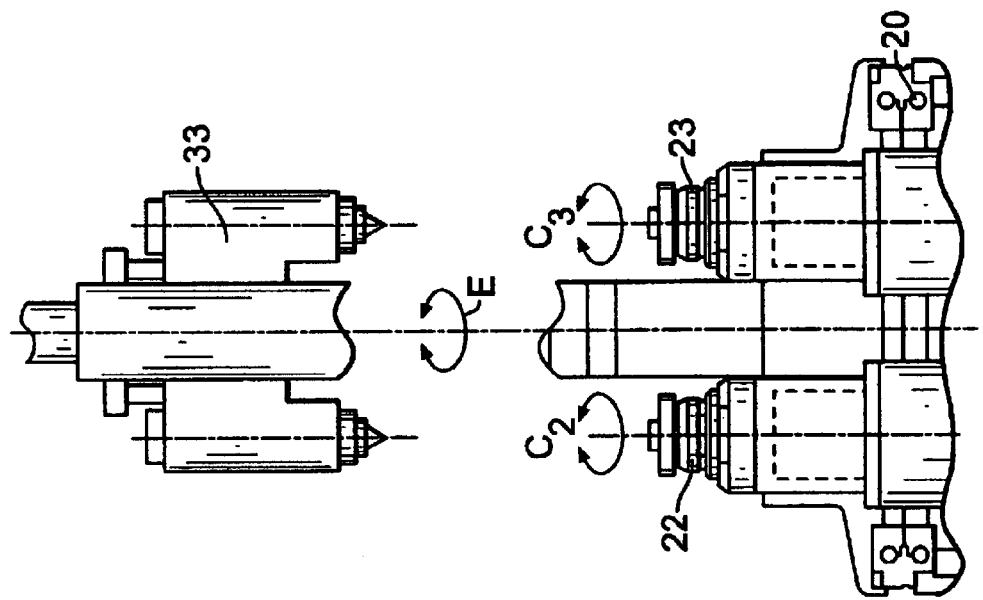
FIG. 3 a view of an indexing table provided with tailstock centers.

According to the illustration of FIG. 3, two tailstock centers 33 can be additionally arranged on the indexing table 19 for a positional fixation of shaft-type workpieces.

Figure 5:
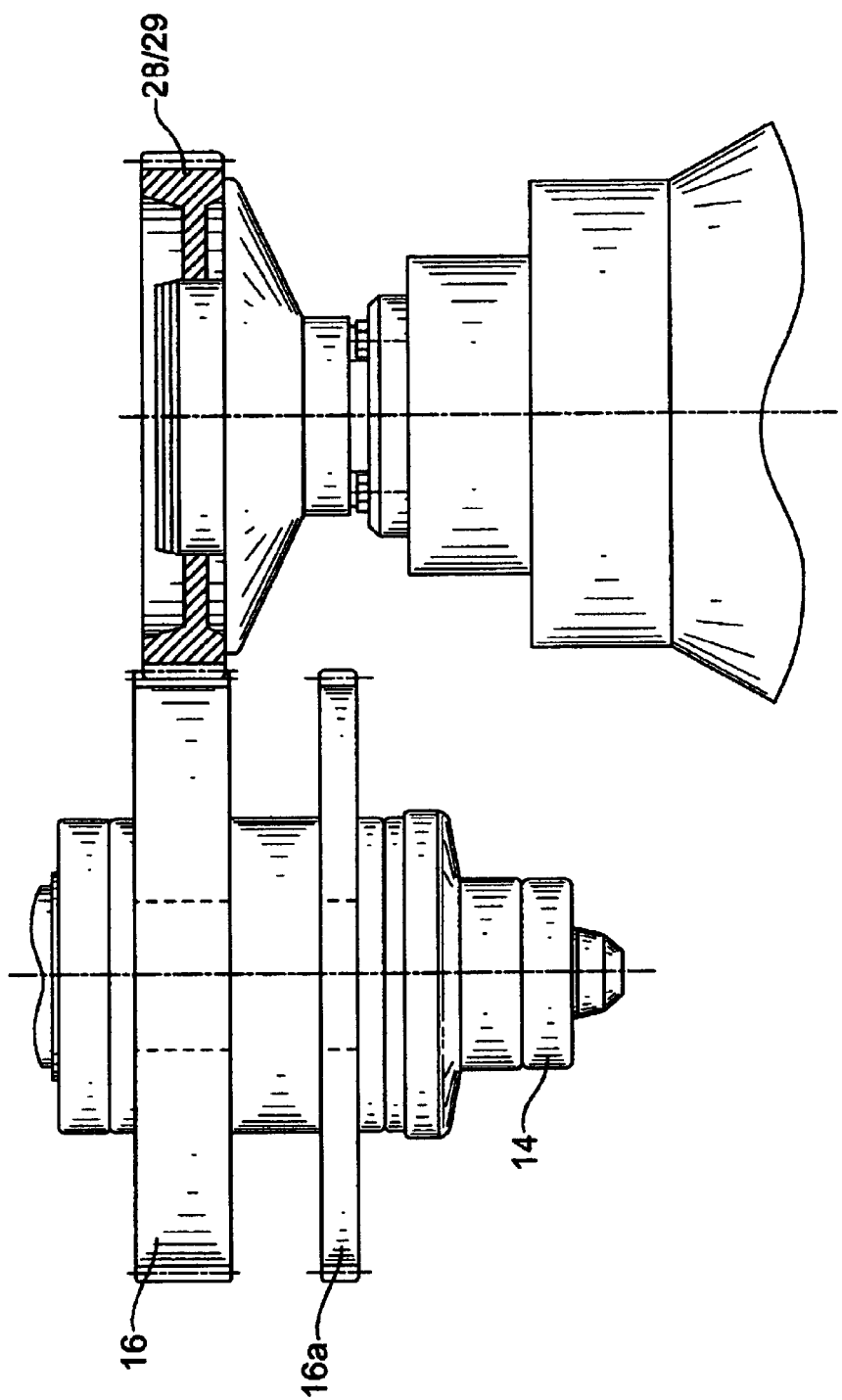
FIG. 5 on an enlarged scale a side view of the tool spindle.
Figure 6A:
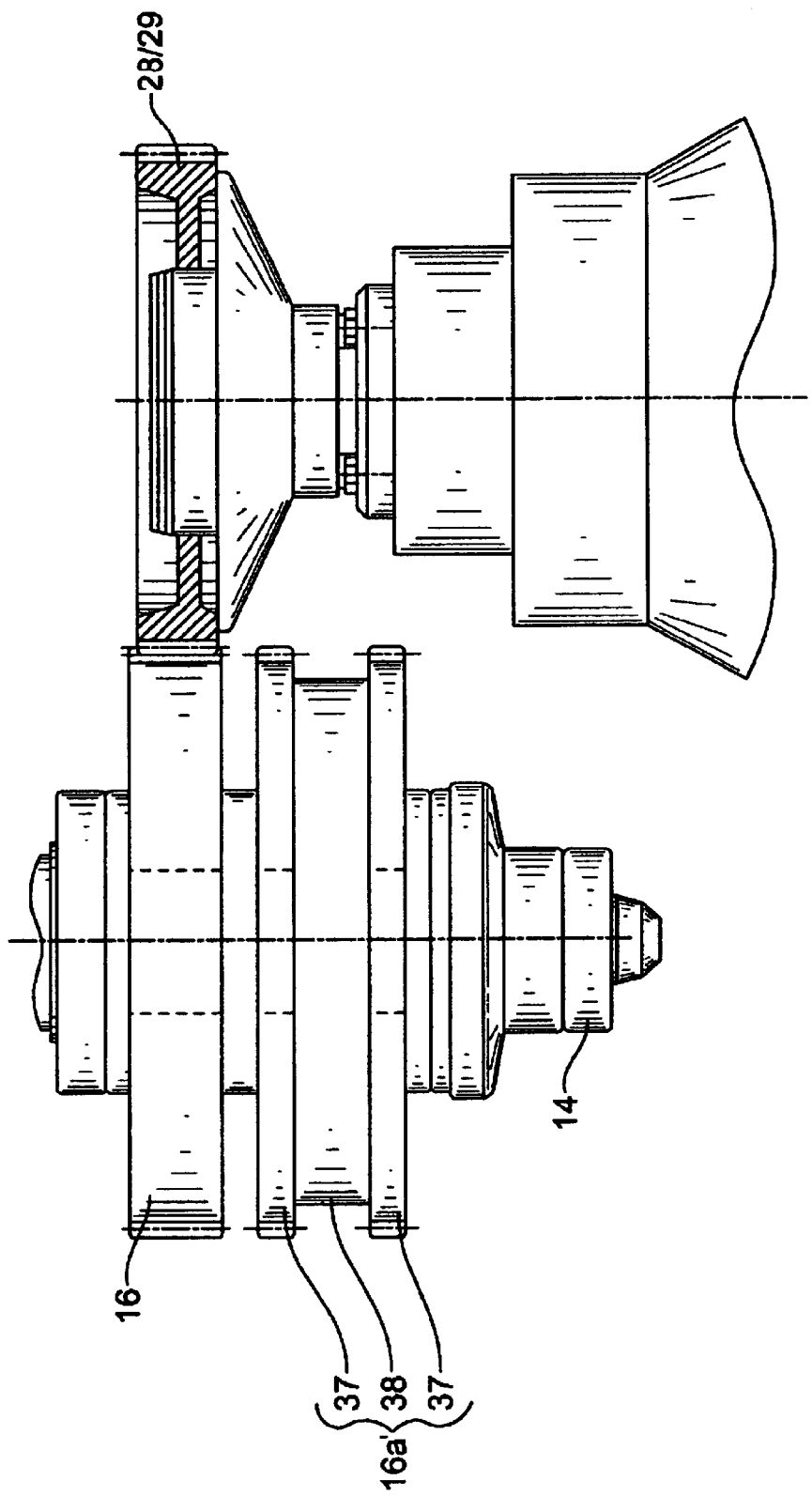
FIGS. 6a and 6b illustrate alternative embodiments of a deburring tool.
Figure 6B:
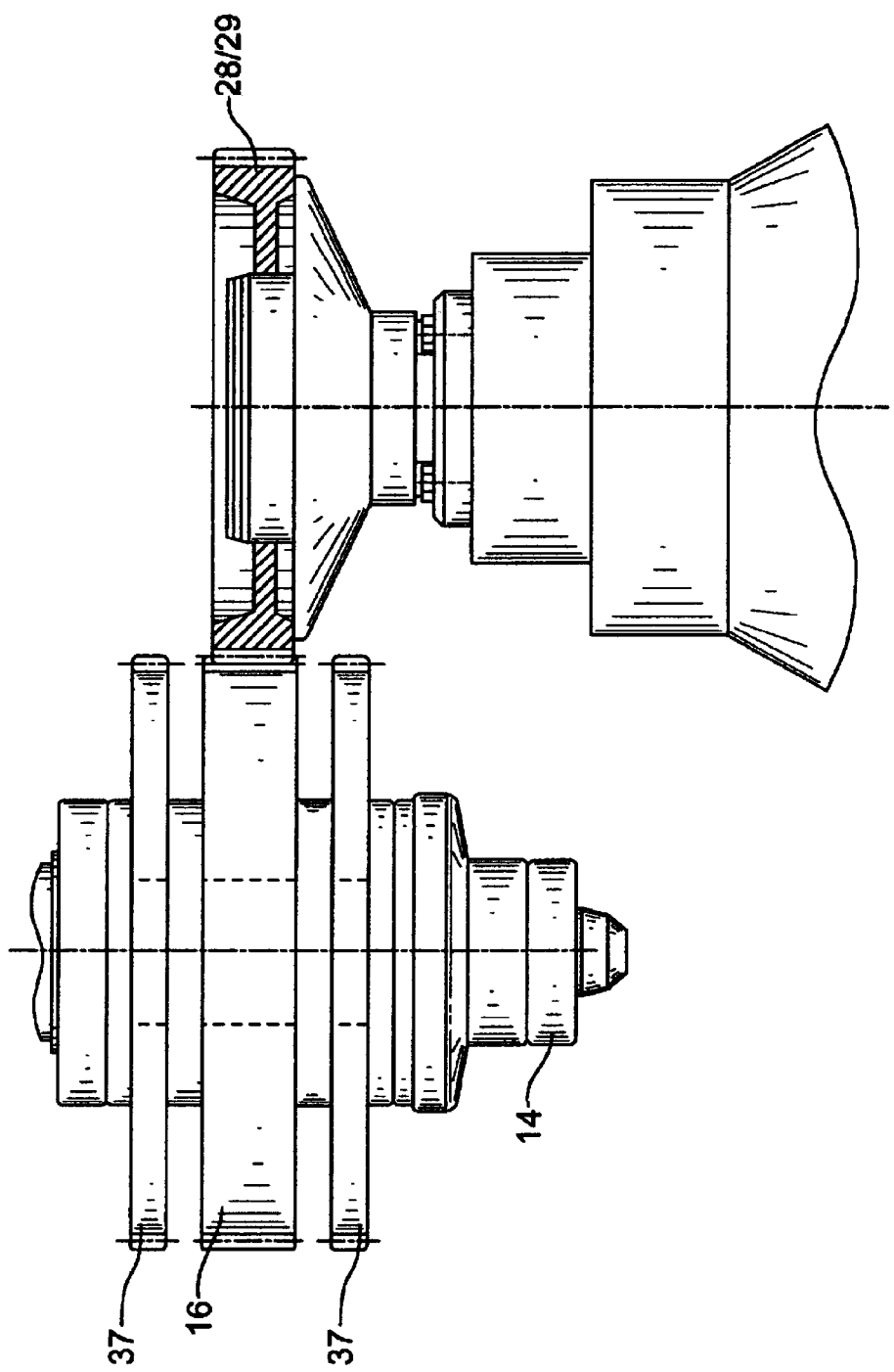

The deburring tool illustrated in FIG. 5 is comprised of a deburring wheel 16a with a double-sided working action. The deburring wheel 16a is fixedly secured on the tool spindle 14 below the fine machining tool 16. However, the opposite arrangement is also possible. The modified deburring tool 16a' illustrated in FIG. 6(a) is comprised of two deburring wheels 37 with single-sided working action and of a spacer wheel 38 positioned therebetween. The complete tool formed of the two deburring wheels 37 and the spacer wheel 38 is arranged underneath the fine machining tool 16 and fixedly connected on the tool spindle 14. However, it is also possible to divide the complete tool and to arrange one of the deburring wheels 37 with single-sided working action above and below the fine machining tool 16, respectively, as illustrated in FIG. 6(b). As already mentioned above, the rotational position of the fine machining tool 16 and of the deburring tool 16a or 16a' relative to one another are defined by an index. By means of axial adjustment of the tool spindle 14, the two leading edges of a workpiece 28 or 29 can be sequentially engaged with one of the two active leading edges of the deburring tool 16a or 16a'. Deburring of the workpiece can be realized by material displacement or by cutting.

Figure 4:
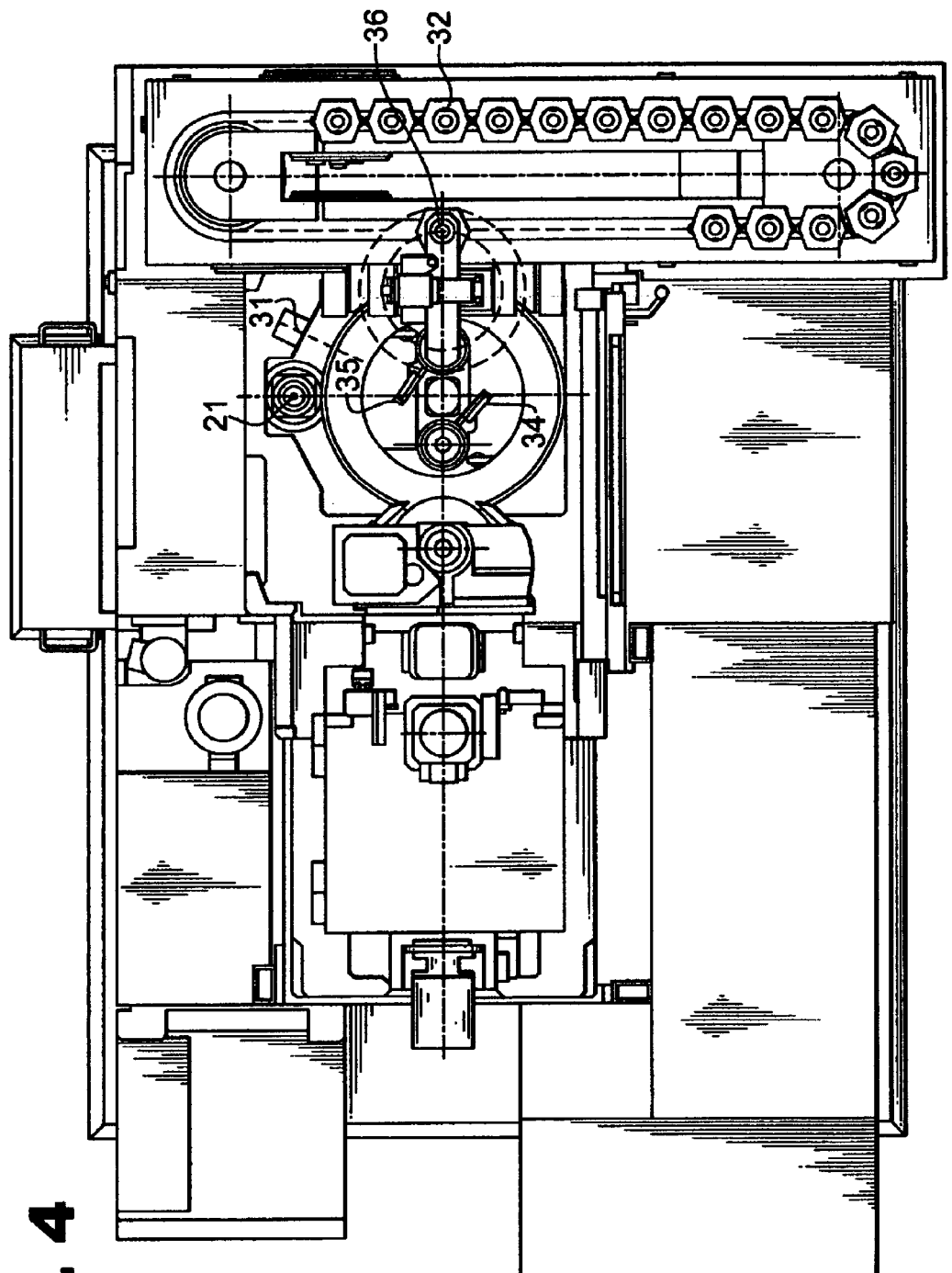
FIG. 4 a plan view onto the machine according to FIG. 1.

As illustrated in FIG. 4, adjacent to the indexing table 19 a magazine 32 for the workpieces 28, 29, still unmachined or machined, is arranged. For an automatic transfer of the workpieces 28, 29 between the magazine 32 and the workpiece spindles 22 and 23 a double gripping system 36 is provided. The double gripping system 36 comprises a swivel arm which is rotatable about a center axis that is parallel to the axis of rotation E of the indexing table 19 and is provided at opposed ends with a gripper. A drive motor (not illustrated) is correlated with the swivel arm.

The two workpiece spindles 22, 23 arranged on the indexing table 19 have correlated therewith a sensor 34, 35, respectively, for determining the relative angular position of the teeth of the workpieces 28, 29 arranged thereon relative to the axis $C_2$ or $C_3$ of the workpiece. The sensors 34, 35 enable, in connection with the electrical coupling of the workpiece spindles 22, 23 with the tool spindle 14, the automatic threading of the workpiece 28, 29 with the deburring tool 16a when the indexing table 19 is rotated into the machining position.

During machining but also for automatic threading of the deburring tool 16a and workpiece 28 or 29, the motor 24 or 25, respectively, is speed-synchronized with the drive motor 17 of the tool spindle 14, according to the transmission ratio of tool and workpiece. The workpiece 28 or 29 to be machined can be loaded by the drive motors 24 or 25 with different torque. The workpiece can thus be driven relative to the tool in an accelerating or decelerating way. Accordingly, during deburring of the workpiece the chamfer width can be freely selected.

After complete deburring of the workpiece 28 or 29, the tool spindle 14 is radially and axially adjusted in order to bring the workpiece into engagement with the fine machining tool 16. Since the rotational position of the fine machining tool 16 and of the deburring tool 16a or 16a' relative to the tool spindle 14 is defined by an index, the threading of the rotating fine machining tool 16 into the workpiece 28 or 29, which is also rotating, is not a problem. It is only necessary to adjust the ratio of the rotational speeds of the drive motors 17, 24 and 25 for the tool spindle 14 and the workpiece spindles 22, 23 to the ratio of the diameters of the fine machining tool and the workpiece.

The different feed and feed rates as well as the rotational speed and torque of the tool spindle 14 and of the workpiece spindles 22, 23 are NC-controlled and freely programmable.

Even though the above described machine is provided with two workpiece spindles, the invention, of course, can also be realized with a machine which has only one workpiece spindle.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A machine for deburring and fine machining of the tooth flanks of toothed workpieces by means of a gear wheel-shaped fine machining tool which is in rolling engagement with a workpiece, said machine comprising:

a machine frame;

a first slide moveably supported on the machine frame and configured to be driven for movements along a first axis X;

a second slide moveably supported on the first slide and configured to be driven for movements along a second axis Z which is positioned at a right angle to the first axis X;

a tool head which is connected pivotably to the second slide and configured to be pivoted for adjusting the axis crossing angle between the fine machining tool and the workpiece about a third axis A which is parallel to the first axis X;

a motor arranged on the tool head for driving a tool spindle;

a workpiece spindle with a clamping device for clamping the workpiece;

a motor for driving the workpiece spindle;

a sensor correlated with the workpiece spindle for determining the angular position of the teeth of the workpiece relative to the axis of the workpiece;

the drive motor of the tool spindle and the drive motor of the workpiece spindle being coupled electronically to rotate, as a function of a signal of the sensor, the fine machining tool and the workpiece relative to one another such that tooth and gap are aligned;

wherein on the tool spindle, in addition to the fine machining tool, at least one toothed deburring tool for deburring tooth end faces is fixedly arranged and wherein the rotational position of the deburring tool and of the fine machining tool relative to the tool spindle is defined by an index.

2. A machine according to claim 1 wherein the deburring tool comprises a deburring wheel with double-sided cutting action.

3. A machine according to claim 1 wherein the deburring tool comprises two deburring wheels with a single-sided cutting action.

4. A machine according to claim 3 wherein the two deburring wheels are assembled with a spacer wheel to a complete tool.

5. A machine according to claim 1 wherein said tool comprises a shaving cutter.

* * * * *